(12) United States Patent
Shelor (10) Patent No.: US 7,552,252 B2
(45) Date of Patent: Jun. 23, 2009

(54) MEMORY INTERFACE CIRCUIT AND METHOD

(75) Inventor: Charles Shelor, Arlington, TX (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 285 days.

(21) Appl. No.: 11/553,570

(22) Filed: Oct. 27, 2006

(65) Prior Publication Data

US 2008/0126642 A1 May 29, 2008

Related U.S. Application Data

(60) Provisional application No. 60/807,656, filed on Jul. 18, 2006.

(51) Int. Cl.
*G06F 3/00* (2006.01)
*G06F 13/12* (2006.01)
*G06F 1/04* (2006.01)
*H04J 3/00* (2006.01)

(52) U.S. Cl. .............................. 710/52; 710/5; 710/62; 370/464; 713/600

(58) Field of Classification Search ........................ None
See application file for complete search history.

(56) References Cited

U.S. PATENT DOCUMENTS

| | | | | |
|---|---|---|---|---|
| 5,884,099 | A | * | 3/1999 | Klingelhofer ................. 710/52 |
| 6,842,831 | B2 | * | 1/2005 | Wilcox et al. ................ 711/154 |
| 2004/0054823 | A1 | * | 3/2004 | Rooney ........................ 710/33 |

* cited by examiner

*Primary Examiner*—Alan Chen
(74) *Attorney, Agent, or Firm*—Thomas, Kayden, Horstemeyer & Risley (57) ABSTRACT

An interface circuit and method are described, in which the interface circuit includes a plurality of bi-directional buffers and logic, responsive to a read request from a system component, configured to identify whether the requested data presently resides in the plurality of bi-directional buffers and is destined to be written from the bi-directional buffers to an external memory, wherein the logic is further configured to supply that data from the bi-directional buffers to the requesting system component, without first writing that data to the external memory.

15 Claims, 5 Drawing Sheets

MEMORY INTERFACE CIRCUIT AND METHOD

CROSS REFERENCE TO RELATED APPLICATION

This application claims the benefit of U.S. provisional application Ser. No. 60/807,656, filed Jul. 18, 2006, the contents of which are incorporated by reference herein.

FIELD OF THE INVENTION

The present invention generally relates to bus arbitration in computing systems, and more specifically to a memory interface circuit and method.

BACKGROUND

Memory controllers are designed to interface to various types of memory, on behalf of one or more requesters (e.g. processors, peripheral devices, etc.). Typically, a memory controller is designed to provide certain latency and bandwidth characteristics. In general, it is desirable to provide low latency and high bandwidth access to memory. However, it is frequently the case that optimizations made to reduce latency may reduce the bandwidth.

Similarly, it is frequently the case that optimizations made to increase the bandwidth lead to increased latency. Thus, the designer must often make choices between low latency features and high bandwidth features in designing a memory controller.

The latency and bandwidth characteristics of a given memory controller may be selected, e.g., based on the expected workload of the memory controller. For example, memory controllers may often be optimized for processor accesses, in which latency is often the key characteristic. Other types of workloads may favor bandwidth over latency. For example, in networking environments, large numbers of packets may be written to and read from memory. While low latency for such accesses is desirable, having high bandwidth may be more important to ensure that the packets can be written to and read from memory without having to drop packets, or without slowing down the network packet traffic with flow control.

Figure 1:
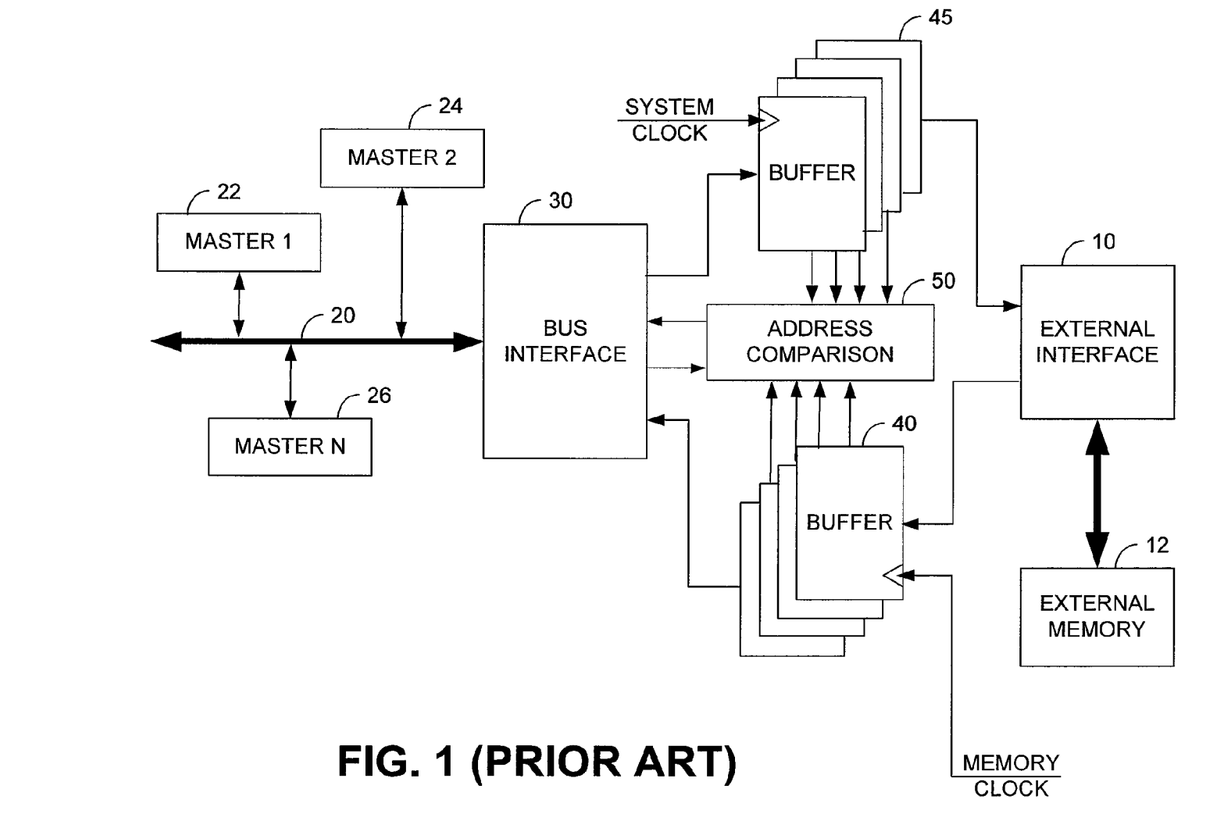
FIG. 1 is a block diagram illustrating certain components of a system known in the prior art.

Reference is made to FIG. 1, which is a block diagram of certain components that illustrate a manner in which devices on a system bus are interfaced with external memory, in a manner that is known in the prior art. For purposes of simplicity, and better illustrating inventive features (by later reference to a comparative diagram of an inventive embodiment), labels and designators for certain devices have been genericized. For example, the diagram of FIG. 1 illustrates an "External Interface" 10, which is coupled to "External Memory" 12. The external interface 10 could be a memory controller, or alternatively could be another device or circuit (e.g., a specialized circuit) for interfacing with memory 12.

As is known, a system bus 20 may be configured to accommodate a number of devices, including a plurality of master devices 22, 24, and 26. In this regard, a master device generically refers to a device that is configured to be capable of assuming control of driving the system bus 20. That is, any device that can assume "mastery" of communications over the system bus 20, at any given time. As an example, a system bus 20 may be coupled to a large number of devices including multiple, independent processors, DMA controllers, print servers, and other devices. At any given time, any of these devices may be responsible for controlling the information that is placed on the system bus 20. Arbitration logic (not specifically shown) is provided to arbitrate the control over the bus 20, so that only one device has mastery or control of the system bus 20 at any given time. This concept and operation is well known, and need not be described herein.

As is also known, the various master devices 22, 24, and 26 may, at times, communicate information with external memory 12. A bus interface (in the form of circuitry and/or logic) 30 is provided to interface the system bus 20 with external memory 12, or as illustrated in FIG. 1, with the external interface 10. Therefore, information communicated from, for example, Master N 26 to external memory 12 is first communicated through bus interface 30, then external interface 10 (which may be a memory controller), then on to external memory 12.

As is further known, communication flow between bus interface 30 and external memory 12 is further enhanced by buffers 40 and 45, which are interposed between the bus interface 30 and external memory 12 (or in the illustrated embodiment, between bus interface 30 and external interface 10). In known systems, certain buffers 40 are designed as read buffers. Data is placed in read buffers 40 when it is sent from external memory 12 to a requesting master device. In this respect, when a master device issues a request to "read" data from external memory, the data is communicated from the external memory 12 to the bus interface 30 via read buffers 40. Likewise, when a master device issues a "write" instruction, to write data from the system bus 20 into external memory 12, such data is first communicated through write buffers 45. In situations where multiple data items are read or written in relatively immediate succession, the utilization of buffers 40 and 45 enhances the speed (and therefore data flow) of these operations.

As an example, consider a situation in which master 22 issues three consecutive write instructions to write data into external memory 12. Without the buffers, the first item of data would be passed through bus interface 30, external interface 10, and written to external memory 12. After the data was written into external memory 12, a confirmation indication would be passed back to the master 22, and after receiving this confirmation, the master would then initiate the write of the next item of data. In contrast, in systems employing write buffers 45, the master may, in virtually immediate succession, write all three items of data into write buffers 45. Thereafter, the external interface 10 and memory 12 will receive the data items. Writing data in this fashion greatly expedites the flow and allows the master 22 to relinquish the system bus 20, such that it is more accessible and available to other master devices coupled to the bus 20. A similar efficiency is gained through the implementation of read buffers 40. As such systems and circuits are well known, further detailed discussion need not be provided herein.

Although these circuits provide certain performance and operational enhancements, they do suffer from various shortcomings. For example, consider a situation in which master 22 issues three consecutive write commands to write various data items into external memory. After issuing these commands, master 22 relinquishes the bus 20. Further assume that master 24 issues a read request for data at an address that corresponds to one of the three items of data just written by master 22. Specifically, assume that the system determines that the data requested by master 24 is presently in a write buffer 45. Address comparison logic 50 is provided to make this determination, and through signaling provided via the bus interface 30, master 24 is instructed to wait for this data (as it is not yet available). Instead, the master 24 has to wait until the data is written from the respective write buffer 45 through the external interface 10 into external memory, before it is "available" to be read by master 24.

The forgoing is merely one illustration of a situation in which further performance enhancements are desired from the systems known in the prior art. Therefore, there is a desire for this and other enhancements to be made to systems known in the prior art.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve certain advantages and novel features, the present invention is generally directed to an interface circuit and method are described, in which the interface circuit includes a plurality of bi-directional buffers and logic, responsive to a read request from a system component, configured to identify whether the requested data presently resides in the plurality of bi-directional buffers and is destined to be written from the bi-directional buffers to an external memory, wherein the logic is further configured to supply that data from the bi-directional buffers to the requesting system component, without first writing that data to the external memory.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

Figure 2:
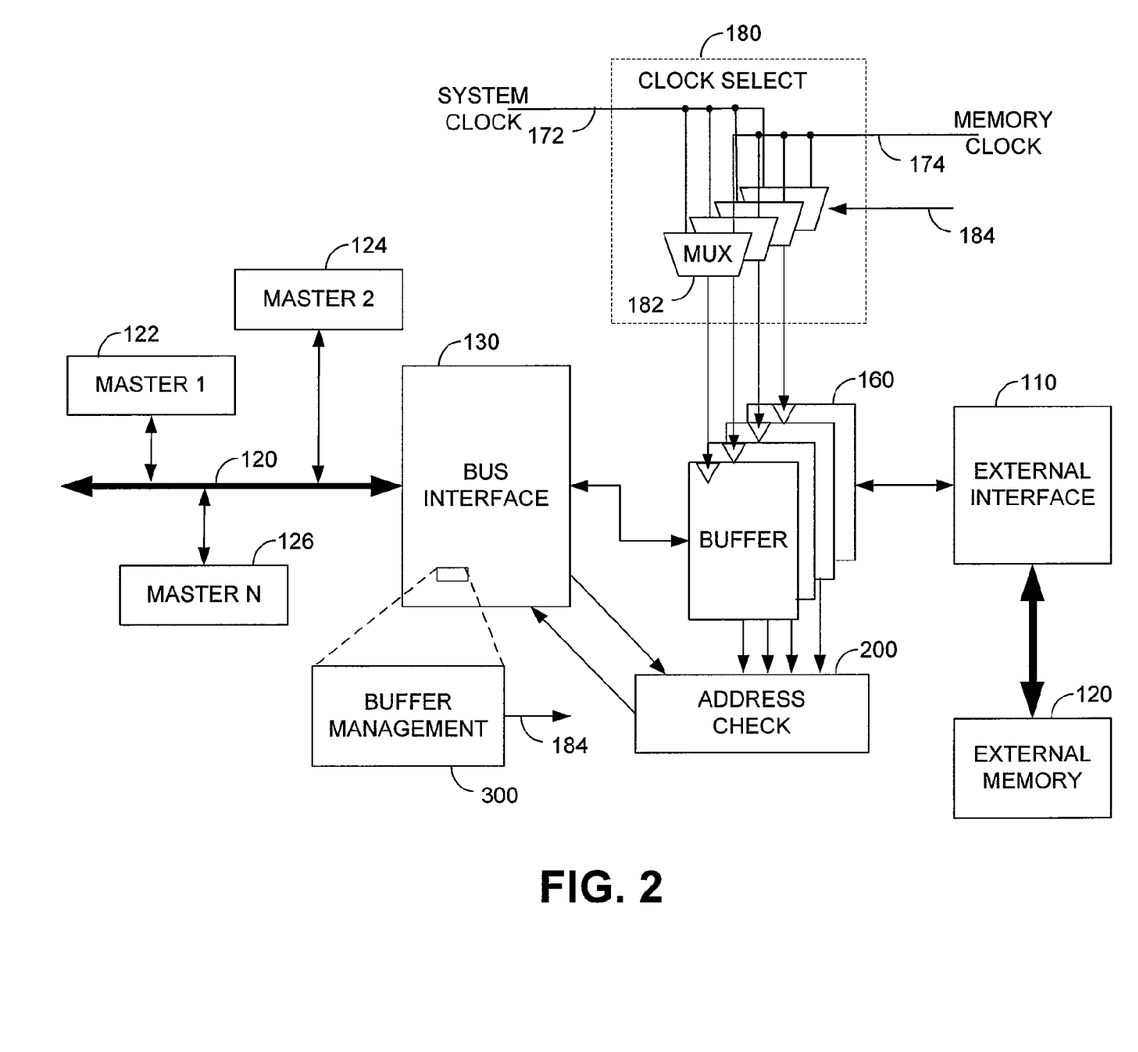
FIG. 2 is a block diagram illustrating certain components of a system, comparable to the system of FIG. 1, constructed in accordance with an embodiment of the present invention.

Reference is now made to FIG. 2, which is a block diagram of an embodiment of the invention. Specifically, the diagram of FIG. 2 illustrates components of a system that is comparable to the system of FIG. 1, for better illustrating certain features and aspects of the inventive embodiment. Like the external interface 10 and the system bus 20 of FIG. 1, the inventive embodiment of FIG. 2 includes an external interface 110 and system bus 120. A plurality of system components, such as master devices 122, 124, and 126, may be coupled to the system bus 120. A bus interface 130 is also illustrated. It will be appreciated from the discussion that follows that, while a high-level functional operation of the bus interface 130 is similar to the bus interface 30 of FIG. 1, internal components and logic of bus interface 130 will include certain additional or different features, in accordance with embodiments of the invention. Central to embodiments of the present invention is the inclusion of bi-directional buffers 160. In this regard, the embodiment of FIG. 2 includes a plurality of bi-directional buffers 160, which can accommodate communications in both directions between the bus interface 130 and external interface 110.

From a top-level operational standpoint, the bi-directional buffers 160 fully accommodate read and write operations in a similar manner to the read buffers 40 and write buffers 45, of the embodiment of FIG. 1. That is, as information is written from a master device through bus interface 130 to external memory (via the external interface 110), that information is written through (or temporarily stored within) one of the bi-directional buffers 160. One significant enhancement, however, of the embodiment of FIG. 2 (over that of the prior art) is the ability for devices on the system bus 120 to immediately read data that currently resides in one of the buffers 160 (that is in the process of being written to external memory). In this regard, address check logic 200 is provided. As is illustrated, the address check logic 200 is coupled to both the bi-directional buffers 160 as well as bus interface 130.

To illustrate this operation, consider an example of master device 122 sending three consecutive data items to be written to external memory. These items are passed through bus interface 130 and written into three of the bi-directional buffers 160. Consider further that this master device 122 relinquishes the system bus 120 and master device 124 issues a read for data from a memory address location that corresponds to an address location that one of the data items written by master device 122 is destined to be written to. Address check logic 200 determines, from the external memory address, that the requested data is currently in one of the buffers 160. Rather than suspend the read operation of master 124 (as was done in the prior art) until the data is first written to external memory, address check logic 200 is capable of configuring the relevant bi-directional buffer(s) 160 to allow the data to be immediately retrieved by the bus interface 130 and passed to the requesting master 124. This allows the bus interface 130 to substantially immediately satisfy the read request by master 124, without master 124 having to further wait for the data to become valid in external memory before its read request can be satisfied. In addition to the read request being promptly satisfied (thereby allowing master 124 to continue its processing operations), this also eliminates the overhead and arbitration associated with the further arbitration of the system bus 120 to communicate this information to master 124, after the data has been written into external memory.

Having described this high-level structure and operation of an embodiment of the invention, further details of this implementation will now be described. As is known, in most systems synchronization is provided through the utilization of one or more clocks. For example, in the system illustrated in FIG. 2, a system clock 172 may be provided for synchronizing communications on the system bus side, while a memory clock 174 may be provided to synchronize communications with the external memory (and external interface 110). Therefore, clocking signals that are provided on the bi-directional buffers 160 are configured so that the bi-directional buffers 160 are synchronized by the appropriate clock signal. In one embodiment, clock select logic or circuitry 180 is provided to ensure that the appropriate clocking signal is coupled to the appropriate bi-directional buffer(s) 160. Therefore, in one embodiment, clock select circuitry or logic 180 includes, as inputs, both the system clock 172 and memory clock 174. Outputs of the clock select logic 180 are coupled to the individual buffers 160. It should be appreciated that, consistent with the embodiments of the invention, the clock select logic 180 may be implemented in a variety of ways.

In one embodiment, as illustrated in FIG. 2, the clock select logic 180 may be implemented through the utilization of a plurality of multiplexers. Specifically, in this implementation, a plurality of multiplexers 182 may be provided in one-to-one correspondence with the bi-directional buffers 160, such that an output of each multiplexer 182 is directly connected (or otherwise coupled) to a clock input of the bi-directional buffers 160. The system clock 172 and memory clock 174 signals may be directly connected (or otherwise coupled) to respective inputs of the multiplexers 182. Multiplexer select inputs 184 are provided to control which clock signal (system clock 172 or memory clock 174) is selected by the multiplexers. In the illustrated embodiment, a single multiplexer select input 184 is connected to the multiplexer select input of each of the multiplexers 182.

In another embodiment (not specifically illustrated), the multiplexer select signals may be independently generated for each of the independent multiplexers. Such an embodiment allows simultaneous communication between certain buffer(s) 160 and the external interface 110 and between other buffer(s) 160 and the bus interface 130. Thus, for communications between a buffer 160 and external interface 110, the multiplexer select signal line 184 will be controlled to select the memory clock 174 signal for the synchronizing clock of the relevant buffer 160. Likewise, for communications between a buffer 160 and the bus interface 130, the multiplexer select signal 184 cause the relevant multiplexer 182 to select the system clock 172 as the clocking signal for the respective buffer 160.

In the illustrated embodiment, buffer management logic 300 is also illustrated. Buffer management logic 300 is illustrated as being a part of the bus interface 130. As will be appreciated by persons skilled in the art, however, the buffer management logic 300 may be implemented separate and distinct from the buffer interface 130. In its broad functionality, the buffer management logic 300 operates to manage the certain operational aspects of the bi-directional buffers 160. Certain of the management aspects will be described in more detail in connection with FIG. 4. However, one such operational feature of the buffer management logic 300 includes the generation of the multiplexer select signal(s) 184 that is used to control the multiplexer select lines of multiplexers 182. Similarly, in embodiments that include clock select logic 180, which does not incorporate multiplexers 182, buffer management logic 300 may include relevant logic for performing a functionally similar operation. That is, in such an embodiment multiplexer select signals would not be generated, but other signals may be generated to control or cooperate with the clock select logic 180 for ensuring the appropriate synchronization of the buffers 160 with system and memory clocks.

Figure 3:
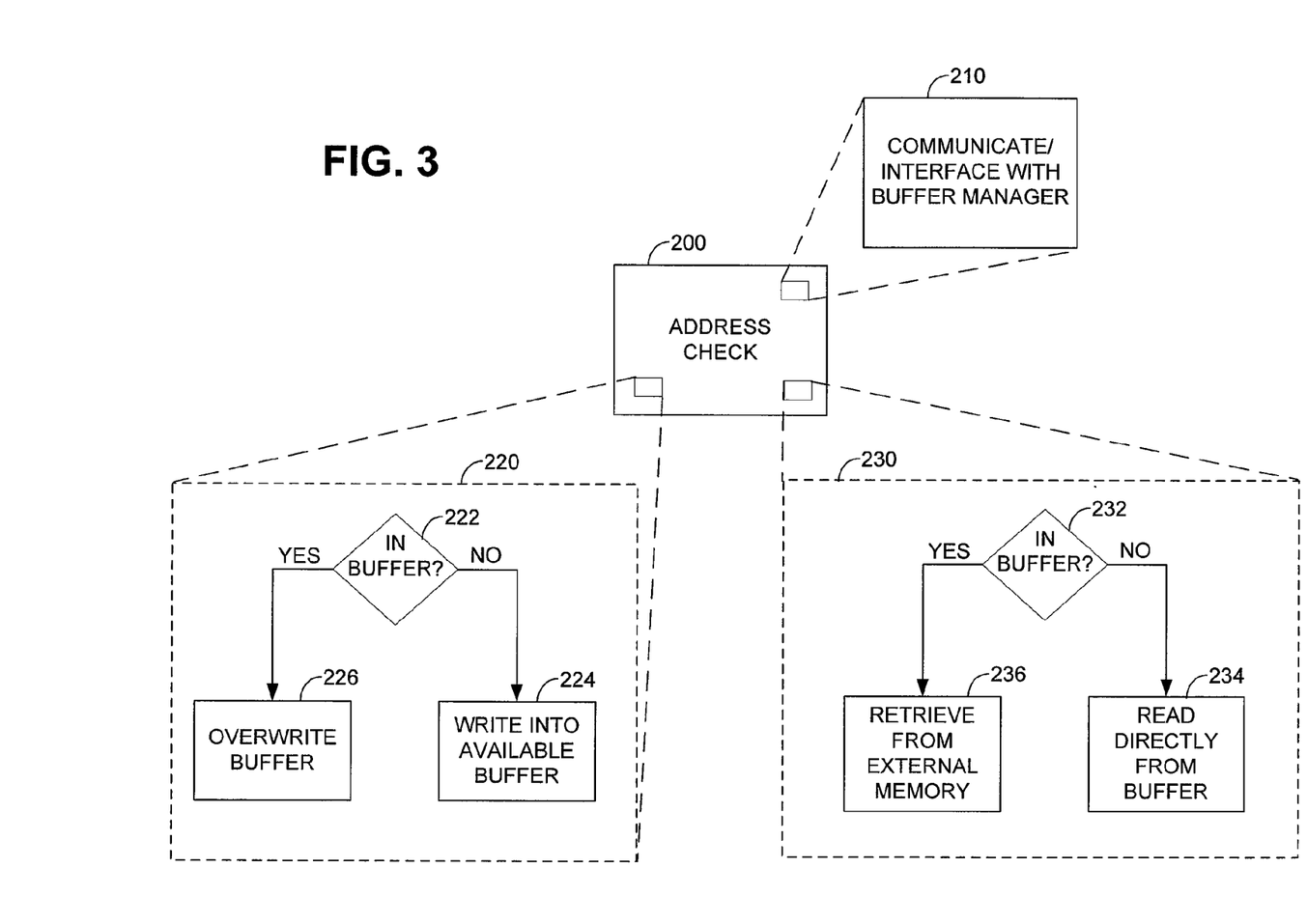
FIG. 3 is a block diagram illustrating certain components of an embodiment of the present invention.

Having described this top-level structural and functional operation of an embodiment of the invention, reference is now made to FIG. 3, which is a block diagram illustrating certain features associated with address check logic 200 of embodiments of the invention. As described in connection with FIG. 2, the address check logic 200 is configured to perform various operations, including a check of the data currently residing in the bi-directional buffers, to determine whether data requested to be read or written presently resides in those buffers 160. In the example presented in the context of FIG. 2, a master device issues a read request, and address check logic 200 determines that the buffers 160 contain data destined to be written from the requested memory location. In such a situation, address check logic 200 operates, in connection with buffer management logic 300 to immediately direct data from the relevant data buffer 160 to the bus interface 130. Of course, the data would remain within the buffer 160 and ultimately be written to the external memory location that the data is destined for. Similarly, if, instead of a read request, a master device issued a write to an external memory location, and one of the buffers 160 presently contained data destined for that memory address, then the address check logic, again in cooperation with the buffer management logic 300, would operate to simply overwrite the current value in the outgoing buffer 160. This would eliminate successive writes to the same external memory location.

In keeping with the description of FIG. 3, address check logic 200 may include logic 210 that is configured to communicate or otherwise interface with the buffer management logic 300. Illustrations of this type of communication or interface have already been presented, and need not be repeated. In addition, persons skilled in the art will recognize other features or aspects of such an interface, based upon design goals and implementations of various embodiments of the invention. Consistent with the examples presented above, the address check logic 200 may also include a write managing logic 220 for managing write operations (i.e., operations in which a master device is writing data to an external memory location). Likewise, the address check logic 200 may include a read managing logic 230 for managing read operations (i.e., requests by master devices to read data from external memory). In the context of write operations, the write managing logic 220 may have a second determining logic operated to determine 222 whether a buffer 160 presently contains data destined for the memory address identified in the write instruction. If not, the write managing logic 220 may have a writing logic 224 provided to write the current data into an available buffer. Otherwise, if a buffer 160 presently has data destined for the identified address, then the write managing logic 220 may have a overwriting logic 226 provided to overwrite the contents of that buffer, with the current data and thereby minimize the number of buffers required as well as minimizing communications between the buffers 160 and external interface 110.

Likewise, in the context of a read operation, the address check logic 200 may include a first determine logic 232, a read logic 234, and a retrieve logic 236. The first determine logic 232 is for determining whether a buffer 160 presently has data destined for the memory address to be read. If so, the read logic 234 may be provided to configure the appropriate buffer to provide the data directly to the bus interface 130 (effectively allowing the data to be read directly from the outgoing buffer without first having to be written to external memory). Otherwise, if no buffer presently has data destined for the requested memory address, then the retrieve logic 236 may be provided to retrieve data from the external memory 120, for example, the read operation may be queued up to read data from external memory through one or more of the bi-directional buffers 160.

Figure 4:
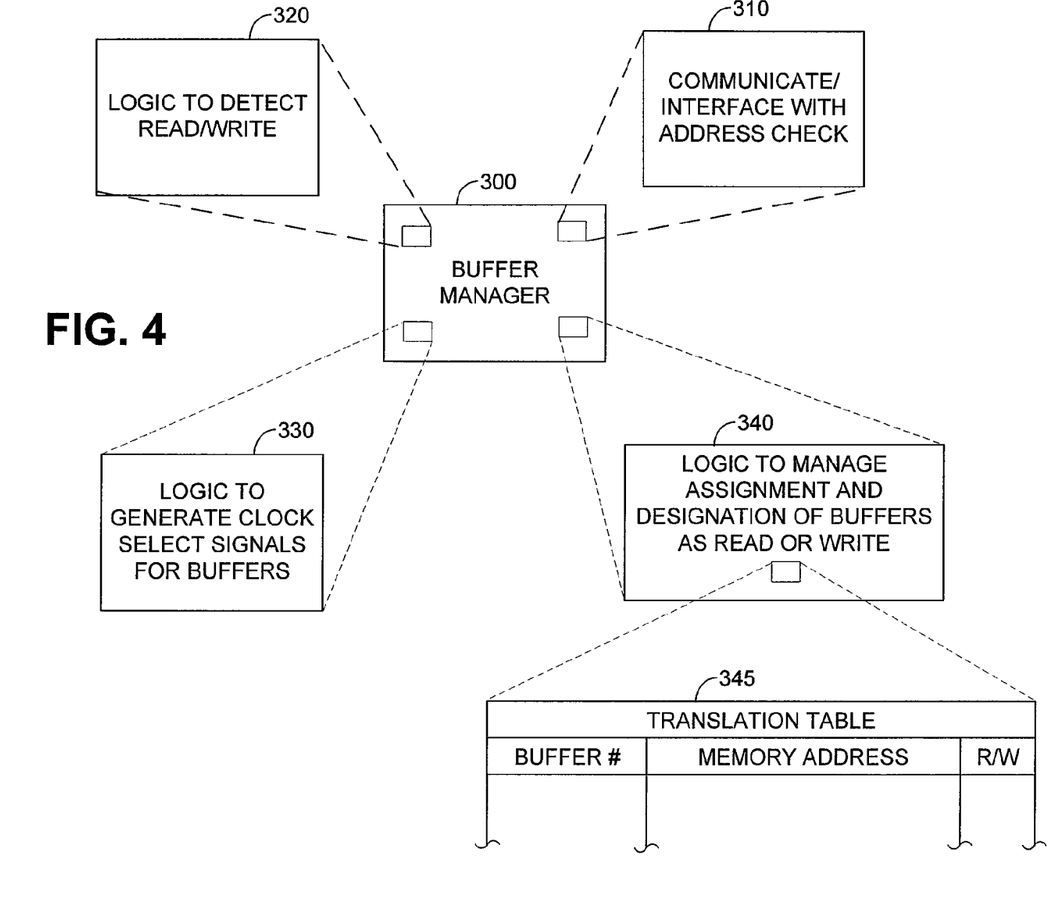
FIG. 4 is a block diagram illustrating certain components of an embodiment of the present invention.

Having described certain top-level features of the address check logic 200, reference is now made to FIG. 4, which is a block diagram illustrating certain top-level features of the buffer management logic 300 of an embodiment of the invention. Like the address check logic, which includes logic for communicating with the buffer management logic, the buffer management logic 300, likewise, includes a second communicate/interface logic 310 for communicating or otherwise interfacing with the address check logic. Depending on the particular implementation, this logic may be in the form of hardware, software, or a combination of the two. Various appropriate implementations will be appreciated by persons skilled in the art, and need not be described herein. In the illustrated embodiment, the buffer management logic 300 may also include a detecting logic 320 for detecting when a master device issues a read request or a write instruction destined for external memory. Either read or write operations implicate the utilization of the buffers 160, and therefor precipitate other operations by the buffer management logic 300 and/or address check logic 200. One such operation is simply the synchronization of the buffers 160 with the appropriate system or signal clock. As described in connection with FIG. 2, the buffer management logic 300 may include a generating logic 330 for generating an appropriate control signal for clock select circuitry. In one embodiment, this clock select circuitry or logic utilizes multiplexers, and the generating logic 330 (in such an embodiment) generates appropriate multiplexer select signals.

In addition, buffer management logic 300 includes a manage logic 340 that is configured to manage the assignment and designation of the various buffers 160. Among other aspects, this management includes the designation of the individual buffers as outgoing or incoming (i.e., read or write buffers in a given context). For example, as data is communicated from the bus interface 130 into one or more buffers 160, to be written to external memory, those buffers would be designated as write buffers. Conversely, as data is inbound from the external interface 110 and is written into buffers 160, those buffers would be designated as read buffers. As will be appreciated, there are a variety of ways that this feature or operation may be implemented within the buffer management logic 300. One way could be through the implementation of a translation table 345 which, among other items or information, may include a buffer number, a memory address or address range, an indication or flag indicating whether the current operation for that memory address is a read operation or a write operation. With regard to the buffer number, in an embodiment which, for example, includes eight 32-byte buffers, the buffer number may be a number of one through 8, which indicates the particular buffer in question. As should be appreciated, the address check logic 200 may interface with the translation table 345 in determining whether a currently requested address is presently contained within the configuration of buffers. To further explain, consider the example where a device writes data from the system bus to external memory. Before that data is written to external memory, assume that it is written in the second buffer. The appropriate entry in translation table 345 would include a line having buffer number 2, the relevant external memory address corresponding to that buffer, and an indication in the read/write column that the buffer is serving currently as a write buffer. If a subsequent read request were initiated by the bus interface 130 for information from that memory address, the address check logic 200 could determine from the translation table 345 that the memory address requested is included in the table. Based on that comparison, the address check logic could control the corresponding buffer number to read the data from that buffer immediately into the bus interface 130 for communication to the requesting device.

It should be appreciated that the forgoing has presented only certain of a variety of embodiments for implementing concepts and features of the present invention. Again, a broad feature of the present invention is the implementation of bi-directional buffers (or buffers that can be configured for operation in either read or write directions), and accompanying logic that allows data presently residing in a buffer destined to be written to external memory to be immediately read from that buffer into the bus interface 130. Corresponding inventive methods are also provided.

Figure 5:
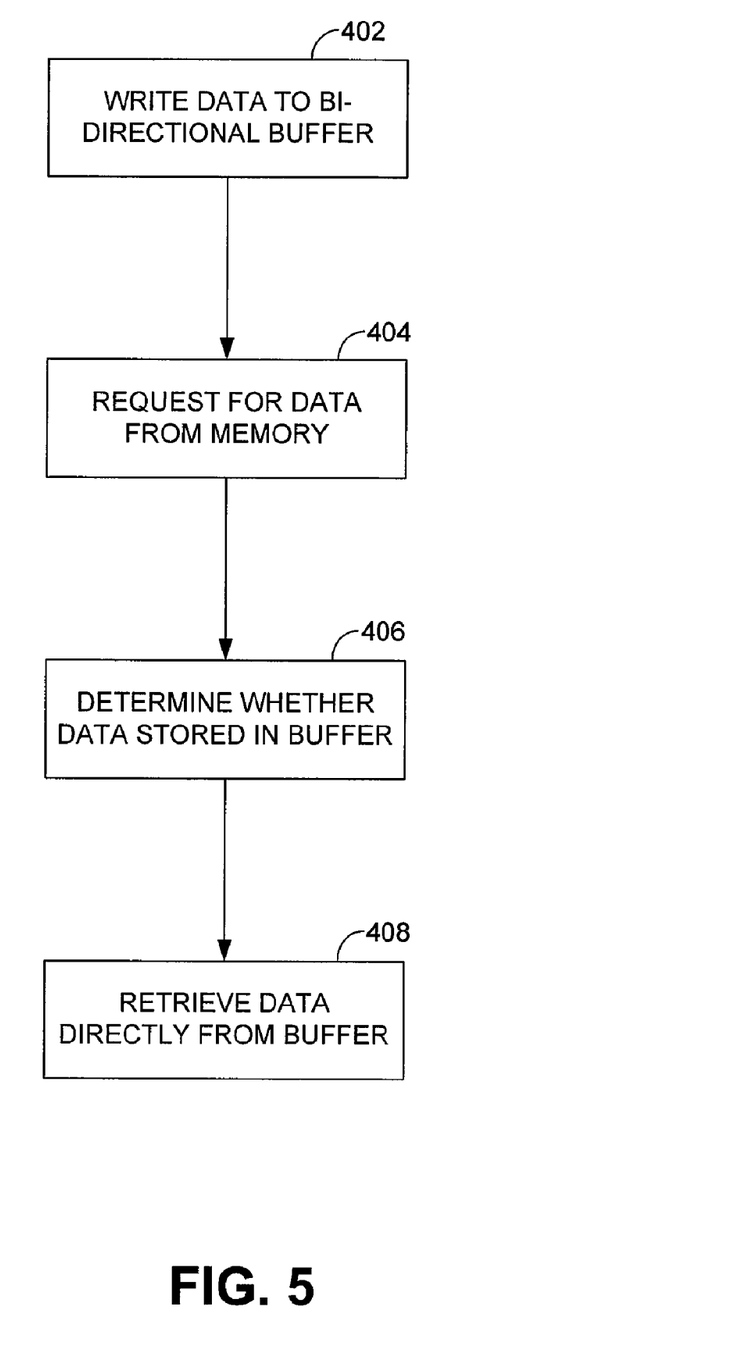
FIG. 5 is a flow chart illustrating the top-level operation of an embodiment of the present invention.

In this regard, reference is made to FIG. 5, which is a flow chart, illustrating the top-level operation of a method constructed in accordance with an embodiment of the present invention. In accordance with this embodiment, a method is provided for interfacing a system bus to a memory. The method comprises writing data to a bi-directional buffer within an interface, in response to an instruction to write data from a device coupled to the system bus to the memory (step 402). Thereafter, the method receives a request by a device coupled to the system bus to retrieve data from memory (404). The method then determines whether the requested data is presently stored or contained within the bi-directional buffer and awaiting communication to the memory (406). Finally, the method retrieves the requested data from the bi-directional buffer for communicating the retrieved data to the requesting device, without first waiting for the data to be written to memory (408).

The foregoing description is not intended to be exhaustive or to limit the invention to the precise forms disclosed. Obvious modifications or variations are possible in light of the above teachings. Further, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An interface circuit comprising:
   a plurality of bi-directional buffers, each of the plurality of bi-directional buffers having a clock input;
   a plurality of multiplexer circuits, wherein the plurality of multiplexer circuits are configured such that there is a one-to-one correspondence between the plurality of multiplexer circuits and the plurality of bi-directional buffers, whereby each of the plurality of multiplexer circuits has an output that is coupled to the clock input of the corresponding bi-directional buffer;
   a memory clock signal coupled to an input of each of the plurality of multiplexer circuits;
   a system clock signal coupled to another input of each of the plurality of multiplexer circuits; and
   buffer manager logic configured to generate control signals for the multiplexer circuits, which control signals independently control the multiplexer circuits to select either the memory clock signal or the system clock for the bi-directional buffers.

2. The interface circuit of claim 1, wherein the buffer manager logic is configured to generate control signals for the multiplexer circuits, such that the multiplexer circuits are configured to select the memory clock signals during times when the bi-directional buffers are communicating with an interface for external memory.

3. The interface circuit of claim 1, wherein the buffer manager logic is configured to generate control signals for the multiplexer circuits, such that the multiplexer circuits are configured to select the system clock signals during times when the bi-directional buffers are communicating with a system bus interface.

4. The interface circuit of claim 1, further including address check logic, responsive to a read request from a system component, configured to identify whether the requested data presently resides in the plurality of bi-directional buffers and is destined to be written from the bi-directional buffers to an external memory.

5. The interface circuit of claim 4, the address check logic includes:
   a first determine logic for determining whether one of the bi-directional buffers presently has data destined for a memory address to be read;
   read logic is provided to configure an appropriate bi-directional buffer to provide the data directly to a bus interface and thus effectively allowing the data to be read directly without first having to be written to the external memory;
   retrieve logic is provided to retrieve data from the external memory if no buffer presently has data destined for the requested memory address.

6. The interface circuit of claim 4, wherein the address check logic is further configured to control the bi-directional buffers to supply the requested data to the requesting system component, without first writing that data to the external memory.

7. The interface circuit of claim 4, wherein the address check logic includes write managing logic for managing write operations in which the system component is writing data to the external memory, the write managing logic includes:
   a second determine logic is operated to determine whether one of the bi-directional buffers presently contains data destined for a memory address identified in a write instruction;
   write logic is provided to write a current data into an available buffer if the determine logic determines no data presently contained in one of the bi-directional buffers; and
   overwrite logic is provided to overwrite the contents of the bi-directional buffer with the current data if one of the bi-directional buffers presently has data destined for the identified address.

8. The interface circuit of claim 4, wherein the buffer management logic includes:
   a second communicate/interface logic for communicating or interfacing with the address check logic;detecting logic for detecting when the system component issues the read request or a write instruction destined for external memory;
   generating logic for generating the control signals; and
   manage logic is configured to include a translation table for managing the assignment and designation of the various buffers, the translation table includes a buffer number, a memory address or address range, an indication or flag indicating whether the current operation for that memory address is a read operation or a write operation;
   whereby the address check logic interfaces with the translation table in determining whether a currently requested address is presently contained within the configuration of buffers.

9. An interface circuit comprising:
   a plurality of bi-directional buffers interposed between a system bus and external memory;
   logic configured to control the communication of data through the plurality of bi-directional buffers, said logic being configured to select a clocking signal for each of the plurality of bi-directional buffers, wherein the selected clocking signal being one of a system clock and a memory clock; and
   address check logic, responsive to a read request from a system component, configured to identify whether the requested data presently resides in the plurality of bi-directional buffers and is destined to be written from the bi-directional buffers to an external memory.

10. The interface circuit of claim 9, wherein the address check logic is further configured to control the bi-directional buffers to supply the requested data to the requesting system component, without first writing that data to the external memory.

11. The interface circuit of claim 9, wherein the clock select logic further comprises a plurality of multiplexer circuits having inputs for both the system clock signal line and the memory clock signal line and outputs coupled to clock inputs of the bi-directional buffers.

12. The interface circuit of claim 11, further comprising buffer manager logic configured to generate control signals for the multiplexer circuits, which control signals control the multiplexer circuits to select either the memory clock signal or the system clock for the bi-directional buffers.

13. The interface circuit of claim 12, wherein the buffer manager logic is configured to generate control signals for the multiplexer circuits, such that the multiplexer circuits are configured to select the memory clock signals during times when the bi-directional buffers are communicating with an interface for external memory.

14. The interface circuit of claim 12, wherein the buffer manager logic is configured to generate control signals for the multiplexer circuits, such that the multiplexer circuits are configured to select the system clock signals during times when the bi-directional buffers are communicating with a system bus interface.

15. A method for interfacing a system bus to a memory comprising:
   writing data to a bi-directional buffer within an interface, in response to an instruction to write data from the system bus to the memory;
   receiving a request by a device on the system bus to retrieve data from an address location in the memory;
   determining whether data is presently stored in the bi-directional buffer and awaiting communication to the address location in the memory;
   retrieving the requested data from the bi-directional buffer for communication to the requesting device without first waiting for the data to be written to the memory.

* * * * *